Figure 1:
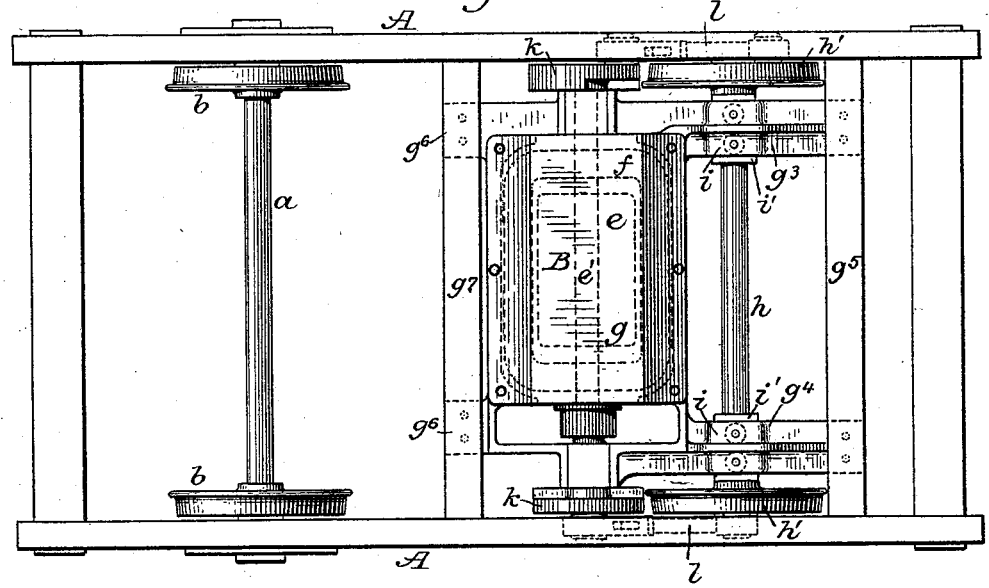

(No Model.) 5 Sheets—Sheet 1.

R. EICKEMEYER.
ELECTRIC LOCOMOTIVE OR STREET CAR MOTOR.

No. 453,167. Patented May 26, 1891.

Attest: Inventor:
Philip F. Larner Rudolf Eickemeyer
Geo. H. Jacobs By _____
 Attorney (No Model.) R. EICKEMEYER. 5 Sheets—Sheet 2.
ELECTRIC LOCOMOTIVE OR STREET CAR MOTOR.
No. 453,167. Patented May 26, 1891.

Attest: Philip F. Larner, Geo. H. Jacobs

Inventor: Rudolf Eickemeyer
By his Attorney

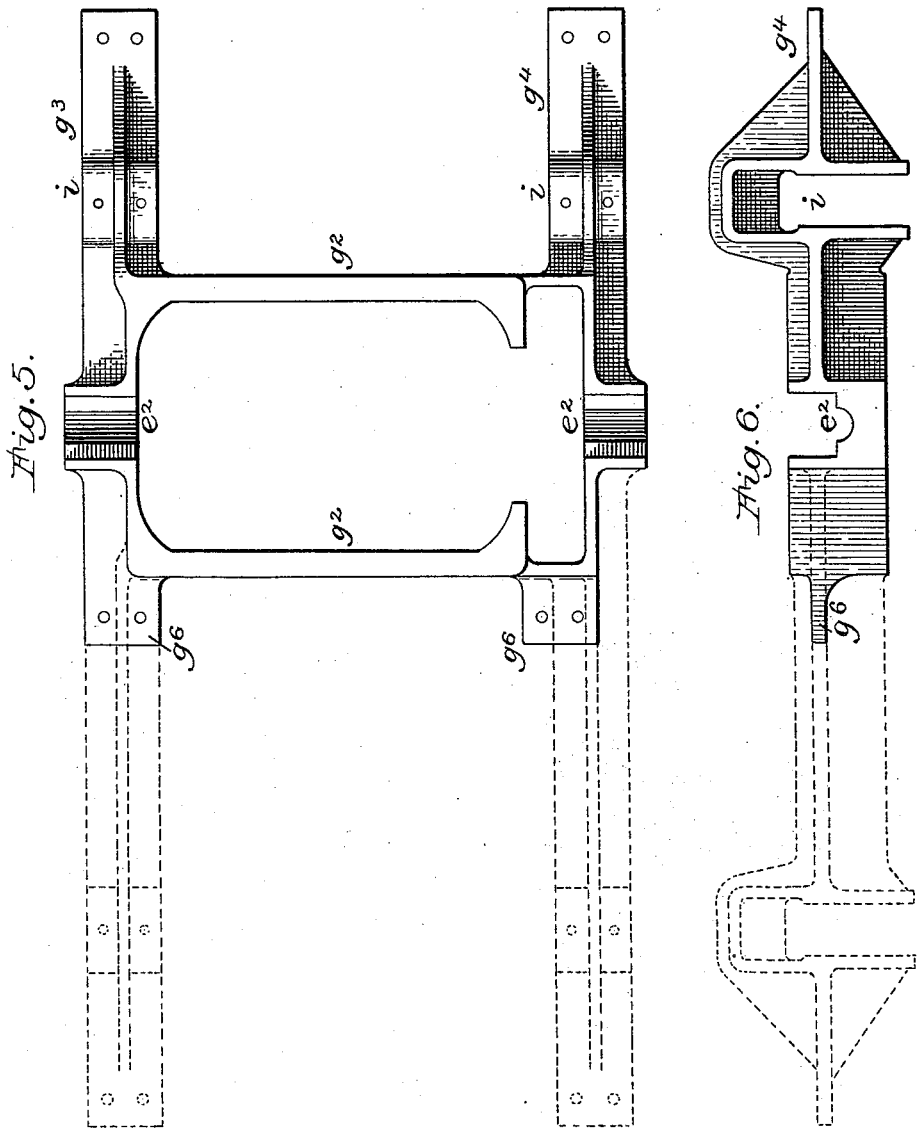

(No Model.) 5 Sheets—Sheet 4.
R. EICKEMEYER.
ELECTRIC LOCOMOTIVE OR STREET CAR MOTOR.
No. 453,167. Patented May 26, 1891.
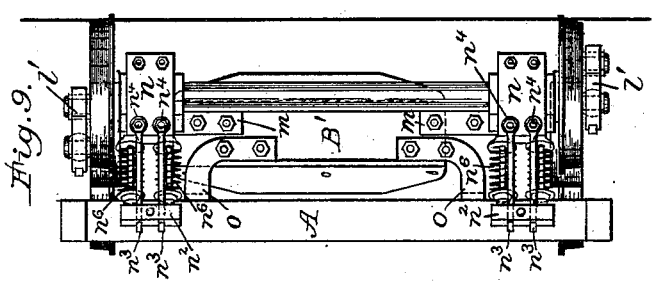
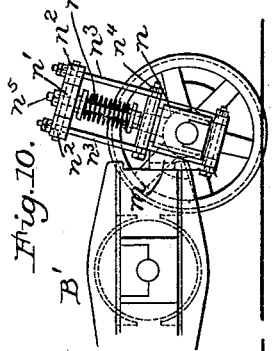
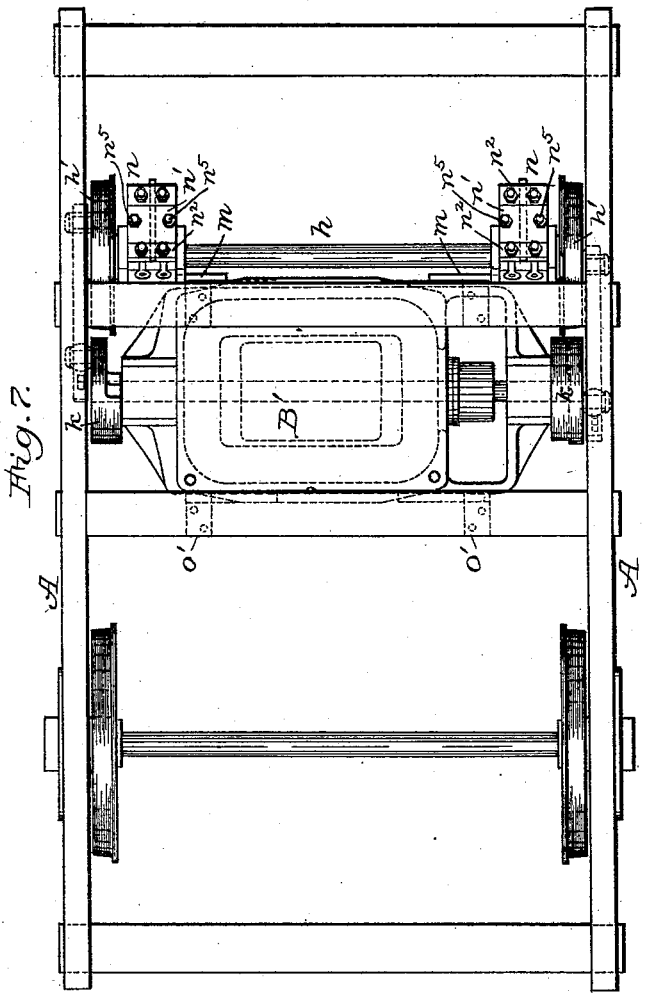
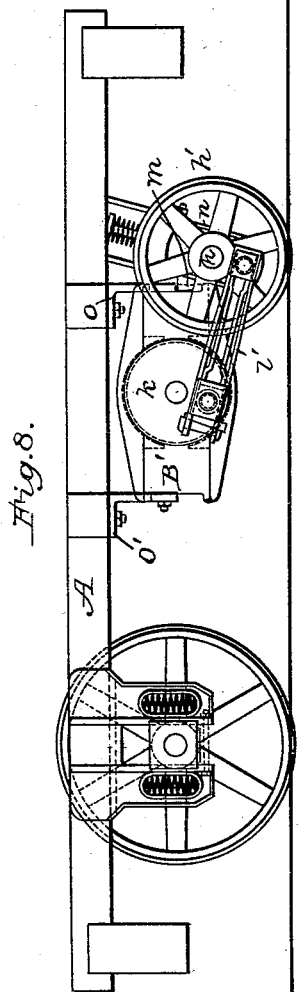
Attest: Philip F. Larner. Geo. of Jacobs.
Inventor: Rudolf Eickemeyer. By ——— Attorney.

(No Model.)　　　　　　　　　　　　　　　　　5 Sheets—Sheet 5.
R. EICKEMEYER.
ELECTRIC LOCOMOTIVE OR STREET CAR MOTOR.
No. 453,167.　　　　　　　　　　Patented May 26, 1891.
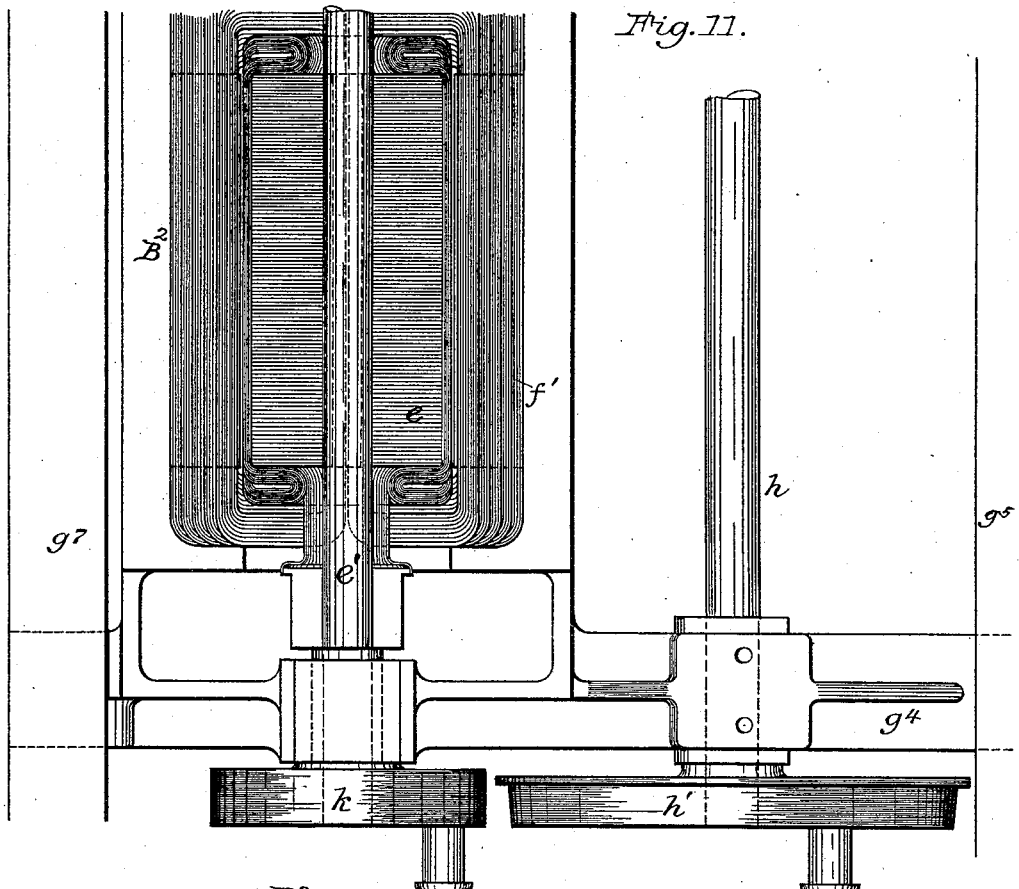
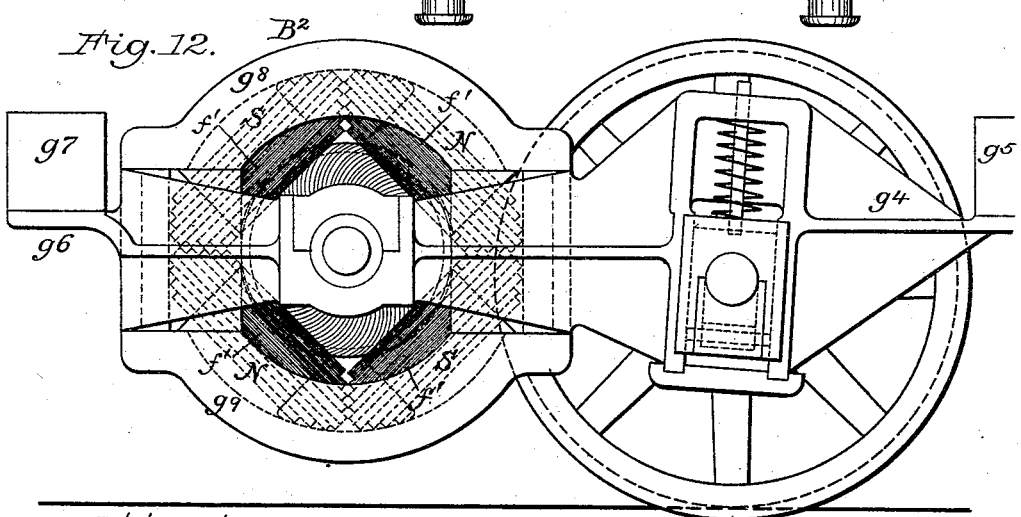

UNITED STATES PATENT OFFICE.

RUDOLF EICKEMEYER, OF YONKERS, ASSIGNOR TO THE EICKEMEYER-FIELD COMPANY, OF NEW YORK.

ELECTRIC LOCOMOTIVE OR STREET-CAR MOTOR.

SPECIFICATION forming part of Letters Patent No. 453,167, dated May 26, 1891.

Application filed October 28, 1890. Serial No. 369,564. (No model.)

*To all whom it may concern:*

Be it known that I, RUDOLF EICKEMEYER, of Yonkers, in the county of Westchester and State of New York, have invented certain new and useful Improvements in Electric Locomotives or Street-Car Motors; and I do hereby declare that the following specification, taken in connection with the drawings furnished and forming a part of the same, is a clear, true, and complete description of the several features of my invention.

In order that the status of my present improvements may be well defined with respect to the prior art in this line, I shall deem it proper to state that heretofore in electric locomotion it has been generally deemed essential that high-speed motors should be employed. With motors requiring high speed for their proper operation reducing-gearing must be employed, and to that end toothed gearing—such as the worm, the beveled, and plain types—have been largely used, also frictional gearings, as well as belting and driving-chains, in each instance so organized as to impart to the driving-axle of the car or locomotive a much slower speed than that at which the armature is rotated.

Electric-locomotive organizations have been heretofore devised wherein the motor-armature has been mounted upon the driving-axle, and in others the driving-wheels have constituted portions of the motor. In machines of this general type shocks between the wheels and rails would be directly conveyed to the comparatively delicate electric portions of the machines, which, as I believe, must greatly impair practical efficiency. In some comparatively few instances electric locomotives have been devised in which the armature-shaft of the motor has been directly coupled to a driving-axle, or the wheels thereon, by means of cranks or crank-pins and pitmen or links, and it is to this direct-connection type of electric locomotives that my present invention pertains. So far as I know said heretofore-devised locomotives have never been applied to practical service. For at least partially indicating the practical value of an organization having direct pitman or link connections as compared with other electric locomotives of the types hereinbefore referred to I will state that in a direct-pitman-connection locomotive all parts of the motor proper may be firmly mounted with relation to each other, as distinguished from those in which distinct and separately operative portions of the motors are carried on the driving-axle, and with the direct pitman connections the motor can be freed from those rail-shocks which must result if any portion of the motor be also a portion of a driving-axle or its wheels. The direct pitman connection also obviates a well-known and serious loss of power, necessarily involved in the use of toothed gearing even under the most favorable conditions, such as few gears and ample lubrication, and with said direct pitman connections there are no such lost-motion strains or any such "backlash" strains as would be incident to the use of belting or chains during frequent stopping and starting, as in street-car service. With the direct pitman connections between the motor and the driving-axle the loss in transmission of power is, as I believe, reduced to a minimum, and the pitmen involve less weight, and they are more reliable than toothed gearing, and are smoother in their operation, as well as noiseless. In electric locomotives having direct pitman connections as heretofore devised slow armature speed has been provided for by armatures of large diameter and a magnetic system correspondingly bulky, so that in some cases it would be only possible to mount the motors for service wholly above the floor of a cab or car. In other cases comparatively huge motors, as complete structures, have been so devised as to be mounted on two axles and to have the cab or car supported on top of the motor. In locomotives so organized the cab or car floor would of necessity be unduly elevated, and this, with the great bulk and weight of the motor, would practically preclude their use under ordinary street-cars and restrict them to service as traction-machines, after the manner of ordinary steam-locomotives. I know of no direct-pitman-connection electro-locomotive devised prior to my invention which if applied to street-railway service would possess the characteristics of electric street-cars embodying my invention, in that mine are the first of the direct-pitman-connection type, which, while possessing ample power for moving a full load at street-railway speed, need not and do not involve in the motor, the motor-frame, the driving-wheels, and their motor connections any more weight than is actually required for affording sufficient tractional friction for properly driving an unloaded car over the heaviest grades of ordinary street-railways. This feature is of great practical consequence in avoidance, first, of undue cost in construction; second, undue wear and tear of the wheels and rails; third, undue waste in electric energy, no more power being required at any time for driving an unloaded car than is absolutely essential. There being no extra or unnecessary weight in the machine, tractional weight to the required degree will be afforded from time to time by the passengers carried by the car. I gain these ends because I employ a motor of my own devising which involves but little weight in proportion to its power, and its armature can be effectively revolved at that comparatively slow speed at which the driving-wheels can be properly driven. My direct-pitman-connection street-cars are also the first known to me which, while having requisite power under slow speed, involves such limited bulk in the motor that it can be safely located in the vertical space usually available between the under surface of an ordinary street-car floor and the surface of the ground between the tracks. This characteristic is of very material consequence, because in new cars there need be no radical departures either in sizes of wheels or in methods of mounting the car-body thereon, or in the construction of car-bodies, their platforms, and steps. This feature also enables the motor and frame, its driving-wheels and axle, and its direct pitman connections to be practically applied to ordinary street-cars now in service and to retain intact on the car one pair of wheels and their axles, thus enabling changes from animal power to electrical with a minimum of expenditure in rolling-stock. I have thus partially indicated the substantial importance of my improvements; but many other advantages will be obviously suggested, all of which, as I believe, will, with prolonged actual working tests of my electric street cars or locomotives, fully demonstrate that electricity can be practically employed with greater economy and with more effective and satisfactory results than are possibly attainable by the use of any other power applicable to street-car service.

My present invention has its foundation in certain improvements in dynamo-electric machines and motors devised by me and disclosed mainly in Letters Patent No. 358,340, dated February 22, 1887. Either bipolar or multipolar motors embodying those improvements, essentially, contain an armature which has an iron core directly polarized by the field coil or coils and magnetic metal so disposed as a casing or shell with relation to said coils and to the armature that substantially all of the magnetic lines developed by the field-coil must pass through some appropriate portions of the armature-core, and most or all of said lines have their circuit within the magnetic metal casing, whereas in the motors of all prior electric street cars or locomotives known to me the circuits of a large proportion of the said magnetic lines are so remote from the armature as to in no manner contribute to efficiency in the machine. It is now to be understood that many advantages accrue from the use of motors of this type, however they may be organized, in street cars or locomotives, and that in my application for patent filed January 28, 1889, Serial No. 297,775, I disclosed a motor of that type with appropriate claims thereto, as well as with claims including a high-speed motor of that type, with speed-reducing gearing. After much experimenting I have demonstrated that it is possible and practicable to develop available magnetic conditions of far greater power in a motor of this type than have ever been obtained, as I believe, in any form of motor of similar or approximating size and weight wherein the magnetic field is afforded by separate electro-magnets. So far as I know all electric motors heretofore organized for and applied to service on street-cars embody magnetic systems which are capable of only partially magnetizing the armature-core, whereas with my machines in actual service I can and do magnetize the armature-cores to complete saturation, limited in each case solely by the magnetic conductivity of the iron in the core, and for that reason my street-car motors are much lighter and of much less bulk than any prior motor known to me having a corresponding working-power. This extraordinary concentration of the magnetic lines of force enables me to not only employ armatures not much, if any, larger than those heretofore used below a car-floor, but to operate them at slow speed and with a power equal to or greater than the power of other prior motors driven at a higher speed. With a motor developing high power when driven at low speed the direct pitman connections are rendered practicable, and with an armature of small diameter and a magnetic system of unusually small weight and bulk in proportion to capacity in power nearly all of the problems in street-car service pertaining to the economic application of electric motors to cars are readily solved; and it will be seen that with a motor in which all of the magnetic lines of force developed by the field-coils must pass through the armature-core there need be only a minimum waste in electric energy.

It will now be readily understood that the main feature of my present invention consists in the combination, with driving-wheels and an axle, of a slow-speed electric motor containing an armature having an iron core, field-coils which surround and directly polarize the armature, and a shell or casing which surrounds the field-coil and armature, springs which relieve the motor from shocks or strains imparted from the rails to the wheels and axles, and pitmen or links with cranks for directly connecting the motor-shaft with the driving wheels or axle.

Certain other important features of my present invention will, after a description thereof, in connection with the drawings, be duly specified in appropriate claims hereunto annexed.

Figure 2:
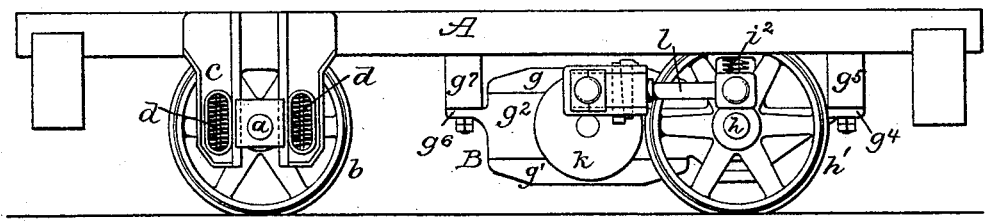
Figure 3:
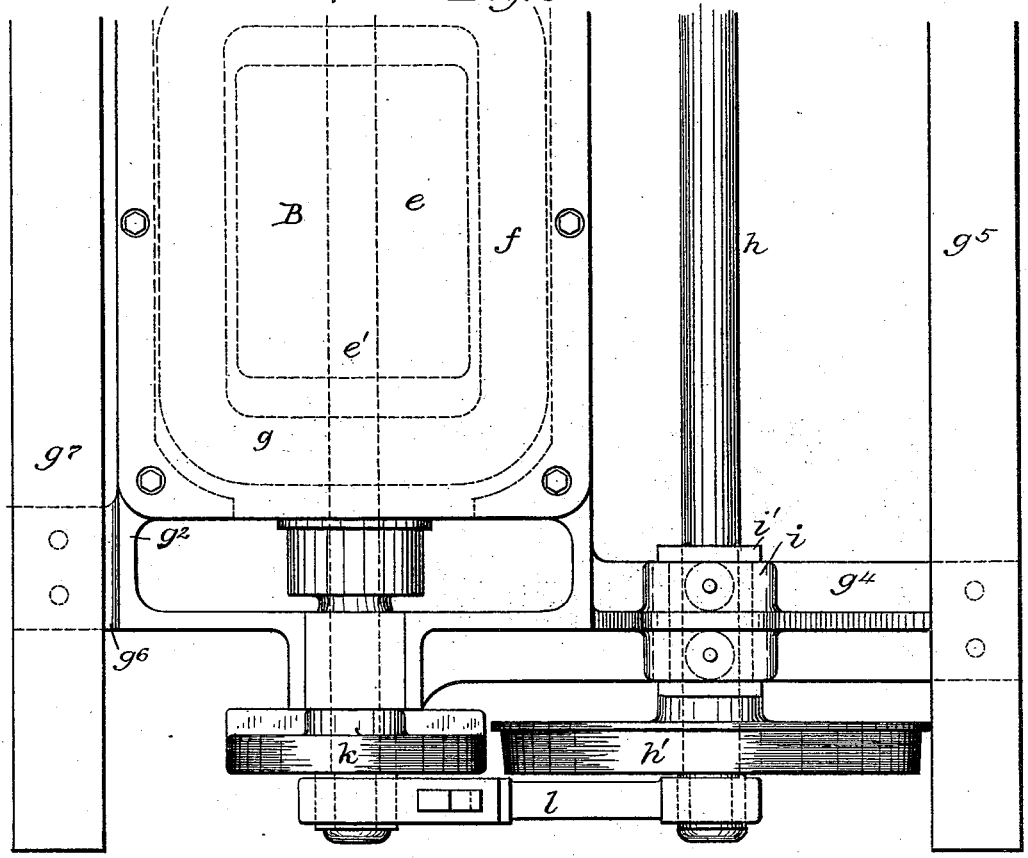
Figure 4:
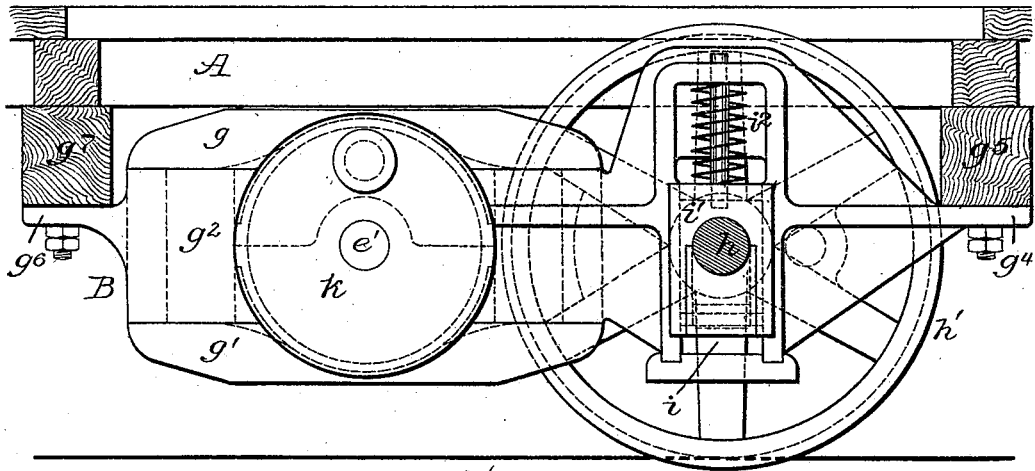

Referring to the drawings, Figure 1 illustrates in plan view a car-floor frame mounted upon one ordinary axle and its wheels and one driving axle and its wheels, the latter being directly connected by pitmen with the shaft of the motor, and the whole constructed and organized in accordance with my invention. Fig. 2 illustrates the same in side view. Fig. 3 illustrates in plan view portions of the motor, the motor-frame, a pitman, and one driving wheel and axle. Fig. 4 illustrates the parts shown in Fig. 3 beneath a car-floor in side view, but with a driving-wheel and its pitman removed. Fig. 5 in plan view illustrates the motor-frame, including the central portion of the motor-casing, with sides or arms and brackets for connection with the driving-axle and car-floor frame. Fig. 6 illustrates said frame in side view. Figs. 7, 8, and 9 in plan view, side elevation, and end view illustrate one of my street-car motors as organized to operate on driving-wheels smaller than those on the non-driven axle. Fig. 10 illustrates the method of spring-mounting one end of the motor on the driving-axle. Figs. 11 and 12 in plan and side view illustrate a four-pole motor and motor-frame constructed and organized with the driving-wheels and car-floor frame in accordance with my invention.

Car-bodies may be mounted upon truck-frames, although in street-cars as usually constructed no truck-frame is interposed between the axles and car-floor; and it is to be understood that the particular construction of said floors and floor-frames may be indefinitely varied without affecting my invention so long as suitable portions thereof are so arranged that proper connection may be made with appropriate portions of what I shall term my "motor-frame," which in an approved form is spring-mounted at one end upon the driven axle while at the other end it is supported by the car-floor frame. Such a motor-frame connected with the driven axle constitutes in one sense a two-wheeled truck, inasmuch as one end of a car is supported thereon; but for sustaining the end of the frame which embodies a part of the motor casing or shell a rigid pendent connection with the car-floor frame is essential. While my present application mainly relates to my motor, so organized with a driving-axle as to co-operate with an ordinary axle and its wheels, certain features of my invention may be employed in connection with a motor-frame which is spring-mounted on four wheels, and is, in fact, a truck upon which a car-body may be carried.

Referring to Figs. 1 to 4, inclusive, a car-floor frame is indicated at A. An ordinary axle $a$ and its wheels $b$ are connected with the floor-frame by means of the usual pedestals, box-jaws or journal-box frames $c$ containing suitable car-springs $d$. These parts being intact, as parts of a street-car already in use, may be employed with driving mechanism embodying my invention.

With outside pitman connections between the motor-shaft and the driving-wheels it is obvious that the car-springs over the driving-axle must be inside of the driving-wheels. If all four wheels of a car be thus driven and all of the car-springs are inside of the wheels, the lateral bearing or tread on the springs is so short as to cause the car to be so easily rocked as to render it objectionable, and hence it is well to have but one axle driven, and thereby retain the broad lateral tread afforded by outside springs on the undriven axle.

In Fig. 1 the motor B has its interior construction indicated in dotted lines to a degree deemed sufficient for the purposes of this specification, inasmuch as said figure shows at $e$ and $e'$ the armature and its shaft and the field-coils at $f$. Said field-coils surround the armature, which, having an iron core, is directly polarized by said coils. The armature and field-coils are well inclosed by an iron casing or shell, which affords a metallic circuit for substantially all of the magnetic lines of force developed by the field-coils, and all of said lines pass through some portion of the core of the armature. With these parts of a motor thus organized I have discovered that I can develop extraordinarily effective magnetic conditions, which are of great importance in electric locomotion and of special value in such organizations as have the motor-shaft directly coupled to the driving-axle by means of cranks and pitmen, and in which the motor-armatures should not be unduly large in diameter nor operated at high speed, and yet they must be capable of affording high motive power. These ends are attained by me because of my motor. I can and do secure, as hereinbefore indicated, a complete magnetic saturation of the iron core of the armature, resulting in such magnetic excitation with corresponding slow speed efficiency as has not heretofore been attained in any street-car motor known to me.

My street-car motor armatures in their best form are provided with windings in accordance with inventions heretofore patented to me. Said armatures embody a separate set of coils or windings previously formed and then assembled on the armature-core and secured to the latter at its ends by means of studs or pins, which afford lateral abutments for each of said coils, and with the usual banding at the periphery said studs render the core and winding a substantially solid structure. Armatures of this type are able to and have successfully resisted the heaviest working strains to which I have ever been able to subject them.

The casing or shell of the motor may be varied in its construction without departure from certain portions of my invention. As here shown, it has a cap-plate $g$ and a bottom plate $g'$, both of which are bolted to and hence detachable from a central main or body portion $g^2$, thus affording convenient access to the armature and field-coils. This body or main portion $g^2$ of the casing is in two parts, each integral with and constituting a cross-beam in what I will call a "motor-frame," which affords bearings for the armature-shaft and has sides or arms $g^3$ $g^4$ projecting to any desired extent, so as to overlie a driven axle $h$ inside of its driving-wheels $h'$, and each of said arms has a jaw $i$ for a journal-box $i'$ and springs $i^2$, as clearly indicated in Fig. 4. It is obvious that the car-floor frame may be mounted on the motor-frame directly over the jaws or journal-box frames, due provision being made for accommodating the spindles of the springs; but I deem it preferable to have the frame sides or arms $g^3$ $g^4$ extended beyond the driving-axle, as indicated, and provided with seats at their outer ends for a wooden cross-beam $g^5$, securely bolted to the side arms, and in turn readily bolted to the car-floor frame. When the motor-frame is thus connected at its front end with the car-floor frame, a small portion of the heavy weight of the motor and casing is fulcrumed on the driving-axle; but the rear end of the motor-frame is mainly supported by the car-floor frame by means of bolts and brackets $g^6$, projecting from the motor-frame, a wooden cross-beam $g^7$ being interposed between said brackets and the car-floor frame. As thus organized it will be seen that the motor is spring-mounted and well guarded against destructive rail-shocks.

At both ends of the motor-shaft $e'$ there are crank-disks $k$ $k$, properly offset and counterweighted, and they are connected with wrist-pins on the driving-wheels $h'$ by means of pitmen $l$ $l$, which at the crank-disks are so jointed as to operate smoothly and obviate injury from such twisting strains as result from tilting movements of the driving-axle.

The main features of my invention are not dependent upon the connection of the pitmen with the driving-wheels, because one of my motors having a proper diameter of armature will afford requisite power to warrant such a shortening of the length of the armature, its shaft, and its casing that pitmen and crank-disks may be located inside of the rail line, so as to be coupled to cranks on the driving-axle, as in old-style steam-locomotives. This mode of coupling the pitmen would serve very well for light cars and it involves no radical changes in the motor-frame beyond the introduction of vertical oval frame-braces at the corners of the motor-casing near the axle for securing strength and also to afford spaces within which the pitmen could freely move, and when so organized the springs on the driving-axle would be located outside of the wheels.

In the organization shown in Figs. 1 to 4, inclusive, the driving-axle and the motor-shaft normally occupy the same horizontal plane, and although both vary somewhat from time to time such variations do not materially affect the operation of the machine.

It will be seen that the attachment of the complete machine to a car involves only the application of four bolts, thus providing for ready disconnection. This feature will enable street-railways having limited rolling-stock to hold one or more machines in reserve and to replace a disabled machine in but little more time than is often afforded between trips at home stations, and it is obvious that such machines can be economically applied to an ordinary street-car upon the removal of one axle, its wheels, and box-jaws. The removal of the driving axle and wheels involves only the disconnection of the pitmen and jacking up the car-body. Access to the armature and one half of the field-coils involves only the lifting of a detachable section of a car-floor and the removal of the cap of the motor-casing, and the removal of the bottom section of the casing affords access to the other half of the field-coils, all of which can be readily removed and others inserted. The armature-shaft having open-topped box seats, as shown at $e^2$, Figs. 5 and 6, enables the armature to be readily lifted through the floor of a car, thus involving but little labor for the removal of the armature, as well as the field-coils, and the insertion of others without disturbing the relations between the car-body, motor-frame, and driving-axle.

The driving-wheels and the pitmen may, if desired, be almost hidden from view when, as in some forms of street-cars, pendent side pieces are employed outside of the box-jaws or pedestals.

For use with driving-wheels of the ordinary sizes the motor is organized with reference to affording the requisite power when the armature is driven at the comparatively low speed necessitated by the use of such driving-wheels.

One form of my machines embodies driving-wheels of comparatively small diameter, as illustrated in Figs. 7 to 10, inclusive. In this organization the motor $B'$ is in all its essential features like that already described; but it is mounted in a different manner. Near each corner of the motor-casing on the side facing the driving-axle $h$ there is a pendent hanger $m$, to each of which an inclined axle-box jaw or frame $n$ is securely attached. Each frame has a head-block $n'$, pivoted between bars $n^2$, secured in place by rods $n^3$, which are free to swing on the bolts $n^4$ by which said rods are fastened to the box-frame. The head-block $n'$ is perforated for two spindles $n^5$, which at their bases occupy seats in the top of the journal-box, and are inclosed by springs $n^6$, which bear upon collars fixed on said spindles, and are borne upon by said head-blocks, which therefore support one end of the motor and whatever portion of the weight of the car as is supported by way of the two angle-brackets $o\ o$, bolted to the car-floor frame and to the central section of the motor-casing. The rear portion of the motor is supported by means of two angle-hangers $o'\ o'$, also bolted to the car-floor frame and the central portion of the motor-casing.

The crank-disks $k$, pitmen $l'\ l'$, and the driving-wheels $h'$ are organized as in the machine first described. In this organization the motor-shaft and driving-axle occupy different horizontal planes, and the inclined journal-box jaws secure good working relations in the several lines occupied by the pitmen, and the pulling and thrusting strains, although they operate in lines inclined to the plane of the car-floor, cannot cause the car-body to vibrate, and the same is obviously true of the machine first described, wherein the pitmen operate in planes parallel with the car-floor.

The two motors thus far described are of the bipolar type; but the prime advantages of my invention may be secured by the use of my motors of the multipolar type—as, for instance, as illustrated in Figs. 11 and 12, wherein I show a four-pole motor of the general type disclosed in Letters Patent No. 422,511, issued to me March 4, 1890, although I have specially devised this motor $B^2$ for use in locomotion. This casing and motor-frame is in the main like those in Fig. 1, but slightly-inclined axle-box jaws are employed, because the driving-axle $h$ occupies a plane but little below that of the motor-shaft $e'$. In this motor the armature $e$ and its shaft are mounted as before described, but the top plate $g^8$ and bottom plate $g^9$ are each so recessed on their inner sides as to properly house the main portions of the several field-coils $f'$, which are so arranged with relation to the armature as to surround portions thereof and to directly polarize its core, and the casing as a whole affords a magnetic circuit for the lines of force, all of which pass through some portion of the armature-core, thus affording the high power and slow speed required in a machine which is of such small bulk that it may be located below the floor of a street-car provided with wheels of ordinary sizes, and which has the motor-shaft directly connected by cranks and pitmen with the driving-axle. In my machines the pulls and thrusts of the pitmen are practically horizontal, or in lines so nearly at right angles to the line of spring action as not to cause vertical vibration of the car-body or of the motor-frame, whereas in all prior designs known to me wherein direct pitman connections were provided for, the pulling and thrusting strains would be in lines so nearly vertical as to cause the motor and the car-body mounted thereon to rise and fall on its springs.

It will now be seen that no portions of my motor-frames need be made of such expensive non-magnetic metal as is common in electric street-car motors, in many, if not all, of which the armature-bearings are on arms or brackets composed of brass or bronze and bolted to adjacent portions of the motor-frame. In each of the machines shown the central portion of the casing is non-polar or magnetically neutral, the poles in the motors B and B' being in each instance located at the upper and lower sides of the armature and casing, and in the four-pole motor $B^2$ poles N S N S are located at diametrically-opposite points, respectively, above and below the central or non-polar frame portion of the casing which supports the two ends of the armature-shaft.

The location of the box-seats for the armature or motor-shaft at the upper edges of the sides of the motor-frame and locating the open jaws for the journal-boxes of the driving-axle at the lower edges of said sides is a feature of great practical value.

The special advantages of this form of motor-frame are not restricted to one which has box-jaws for the driving-axle only; but they are available to the same or greater extent when the frame has jaws for the boxes of two axles, as indicated in dotted lines in Figs. 5 and 6, the sides being appropriately extended for that purpose. In such frames the portions of the motor-casing which serve as cross-beams may be separately constructed and bolted to the sides and in proper relation to the box-seats for the motor-shaft, which may be located exactly between the axle-box jaws, so that all four wheels of a car may be provided with crank-pins and enable one pair to be used as driving-wheels until worn so as to unfit them for that purpose, and then the other pair may be used as drivers; or, as is sometimes desirable, the four wheels can be used as drivers by the use of suitable crank-pins or studs and links or shackle-bars, as in ordinary steam-locomotives; but in such cases the disadvantages of having all of the springs inside of the driving-wheels would be encountered.

It is obvious that those cross-beam portions of the motor-frame which serve as central portions of the motor shell or casing will necessarily involve considerable weight of metal; but every other portion of the motor-frame can be reduced to a minimum of weight and yet possess great strength by a proper disposition of metal and a judicious arrangement of strengthening webs or flanges.

I have hereinbefore referred to my use of locking-pins for confining the armature-winding to the core, and while these are reliable for general service I deem it proper to state that in some cases when specially-heavy slow-speed duty is to be performed it will be advisable to supplement said pins with or to employ in lieu thereof insulated ribs or splines integral with (or fitted to suitable grooves in the face of) the iron core to serve as abutments between the coils.

Having thus described my invention, I claim as new and desire to secure by Letters Patent—

1. In an electric street-car or locomotive, the combination, substantially as hereinbefore described, of driving wheels and axle, a slow-speed electric motor having an iron-cored armature, field-coils which surround and directly polarize the armature, and a shell or casing which surrounds the armature and coil, springs which relieve the motor from strains and shocks imparted from the rails to the axles or driving-wheels, and pitmen or links with cranks which directly connect the armature-shaft and the driving wheels or axle.

2. In an electric street-car or locomotive, the combination, substantially as hereinbefore described, of a slow-speed electric motor provided with an armature which is directly polarized by field-coils and has a magnetic shell or casing which surrounds the field-coils and armature, a driving-axle provided with boxes which are mounted in hangers rigidly projecting from one end of said motor-casing, springs interposed between said boxes and hangers, pitmen and cranks directly coupling the motor-shaft with the driving-axle, a non-driven axle, its wheels and its springs, and a car-receiving frame supported on the springs above both axles and sustaining one end of the motor and its casing.

3. In an electric locomotive, the combination, with a spring-mounted car-body, of an electric motor located beneath and attached to the car-floor frame, a pair of driving-wheels, and pitmen or links and cranks which directly couple the motor-shaft with the driving-axle, substantially as described.

4. In an electric locomotive, the combination, substantially as hereinbefore described, of an electric motor having a casing which is provided at one end with rigid forwardly-extending frame-arms, each having a journal-box frame and also a seat for supporting a car-floor frame or truck-frame, and at the opposite end of said casing suitable hangers by which that end of the motor may be supported by a car-floor frame.

5. An integral iron motor-frame for electric street cars, substantially as hereinbefore described, consisting of parallel sides provided with journal-box seats for the motor-shaft and driving-axle, and cross-bars which rigidly unite the sides and constitute central portions of the shell or casing of the motor.

6. A motor-frame for electric street-cars, substantially as hereinbefore described, consisting of portions of the shell or casing of the motor serving as cross-beams, and two parallel sides, each having at its upper edge a recessed or open box-seat for one end of the motor-shaft, and at its lower edge a journal-box jaw for one end of a driving-axle, whereby the armature-shaft and driving-axle may be located in substantially the same horizontal plane and enable the armature to be lifted from its bearings, and also when said frame is attached to a car enable the driving-axle and its wheels to be disconnected from the motor-frame by lifting one end of the car.

RUDOLF EICKEMEYER.

Witnesses:
JOHN D. IHLDER,
HENRY OSTERHELD.